(12) United States Patent
Fosbinder

(10) Patent No.: US 8,759,714 B2
(45) Date of Patent: *Jun. 24, 2014

(54) PORTABLE GENERATOR AND BATTERY CHARGER VERIFICATION CONTROL METHOD AND SYSTEM

(75) Inventor: Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1341 days.

This patent is subject to a terminal disclaimer.

(21) Appl. No.: 11/825,584

(22) Filed: Jul. 6, 2007

(65) Prior Publication Data

US 2009/0008374 A1    Jan. 8, 2009

(51) Int. Cl.
*B23K 9/10* (2006.01)
*H05B 7/11* (2006.01)

(52) U.S. Cl.
USPC ..................... 219/130.21; 219/133

(58) Field of Classification Search
USPC ...... 219/130.01, 130.1, 130.21, 133, 137 PS; 320/105, 106, 152; 324/427, 431, 433
See application file for complete search history.

(56) References Cited

U.S. PATENT DOCUMENTS

| 4,667,141 | A | * | 5/1987 | Steele | 320/105 |
|---|---|---|---|---|---|
| 4,799,039 | A | * | 1/1989 | Balcom et al. | 340/333 |
| 5,410,126 | A | * | 4/1995 | Miller et al. | 219/130.1 |
| 5,602,462 | A | * | 2/1997 | Stich et al. | 323/258 |
| 5,767,661 | A | * | 6/1998 | Williams | 320/152 |
| 6,204,639 | B1 | | 3/2001 | Takano et al. | |
| 6,818,860 | B1 | * | 11/2004 | Stava et al. | 219/130.1 |
| 6,833,683 | B2 | * | 12/2004 | Winkler | 320/109 |
| 6,876,096 | B2 | * | 4/2005 | Du Plessis et al. | 290/4 C |
| 7,211,764 | B2 | | 5/2007 | Leisner | |
| 7,741,815 | B2 | * | 6/2010 | Cassidy | 320/152 |
| 2003/0085254 | A1 | * | 5/2003 | Katooka et al. | 228/101 |
| 2005/0133489 | A1 | * | 6/2005 | Gitter et al. | 219/133 |
| 2006/0028178 | A1 | * | 2/2006 | Hobbs | 320/128 |
| 2006/0037953 | A1 | * | 2/2006 | Matthews et al. | 219/133 |
| 2006/0215389 | A1 | * | 9/2006 | Fosbinder et al. | 362/85 |
| 2007/0024246 | A1 | * | 2/2007 | Flaugher | 320/150 |
| 2007/0072014 | A1 | * | 3/2007 | Kim et al. | 429/7 |
| 2007/0181547 | A1 | * | 8/2007 | Vogel et al. | 219/130.1 |
| 2008/0264921 | A1 | * | 10/2008 | Kropp et al. | 219/133 |
| 2008/0264922 | A1 | * | 10/2008 | Fosbinder | 219/133 |
| 2008/0297103 | A1 | * | 12/2008 | Windsor | 320/101 |

FOREIGN PATENT DOCUMENTS

| DE | 4203854 A1 | * | 9/1992 | G01R 31/36 |
|---|---|---|---|---|
| JP | 04325836 | | 11/1992 | |
| WO | WO2007142876 | | 12/2007 | |
| WO | WO2008134182 | | 11/2008 | |

* cited by examiner

*Primary Examiner* — Henry Yuen
*Assistant Examiner* — Hemant Mathew
(74) *Attorney, Agent, or Firm* — Fletcher Yoder P.C.

(57) ABSTRACT

A system may include a portable welding unit having an engine, a generator coupled to the engine, a compressor coupled to the engine, and a smart battery charger coupled to the generator. The smart battery charger may be configured to monitor a temperature of a battery, an ambient temperature, a battery charge time, or a combination thereof. The smart battery charger may also be configured to adjust an output based on a battery type, a battery voltage rating, a sensed feedback, a battery test, or a combination thereof.

26 Claims, 8 Drawing Sheets

PORTABLE GENERATOR AND BATTERY CHARGER VERIFICATION CONTROL METHOD AND SYSTEM

BACKGROUND

The invention relates generally to welding systems and more particularly to welding systems utilizing an engine coupled to an air compressor and welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may also use compressed air to operate plasma cutters, air tools and the like. Typically, compressed air is provided via a standalone air supply. Thus, a welding operator may use, both, a standalone engine-driven welding generator and a standalone air supply. The independence of the two units may increase the amount of time and labor involved with setup, transportation, and so forth. In addition, the independence of the two units may result in an increased amount of maintenance and repair costs due to duplication of parts.

Welding systems are generally configured to output power specifically for welding or cutting rather than other applications. Typically, other power supplies, such as battery chargers, are standalone units. In addition, welding systems lack the intelligence to supply power correctly and safely to other applications, such as batteries.

BRIEF DESCRIPTION

A system, in one embodiment, may include a portable welding unit having an engine, a generator coupled to the engine, a compressor coupled to the engine, and a smart battery charger coupled to the generator. A system, in another embodiment, may include a battery charger, wherein the battery charger is configured to monitor a temperature of a battery, an ambient temperature, a battery charge time, or a combination thereof. A system, in a further embodiment, may include at least one circuit having a welding control circuit and a battery charge circuit. The battery charge circuit may be configured to adjust an output based on a battery type, a battery voltage rating, a sensed feedback, a battery test, or a combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
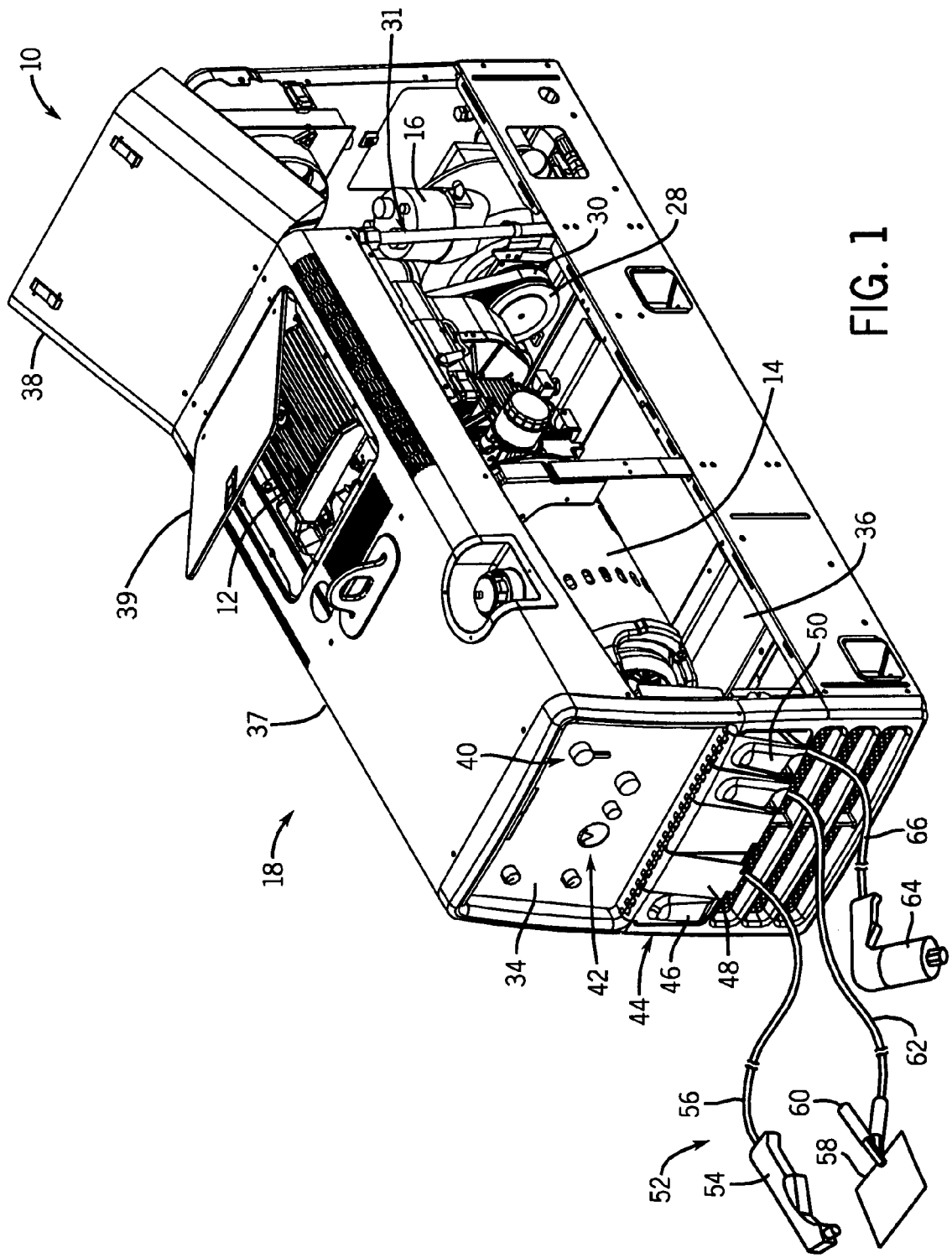
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
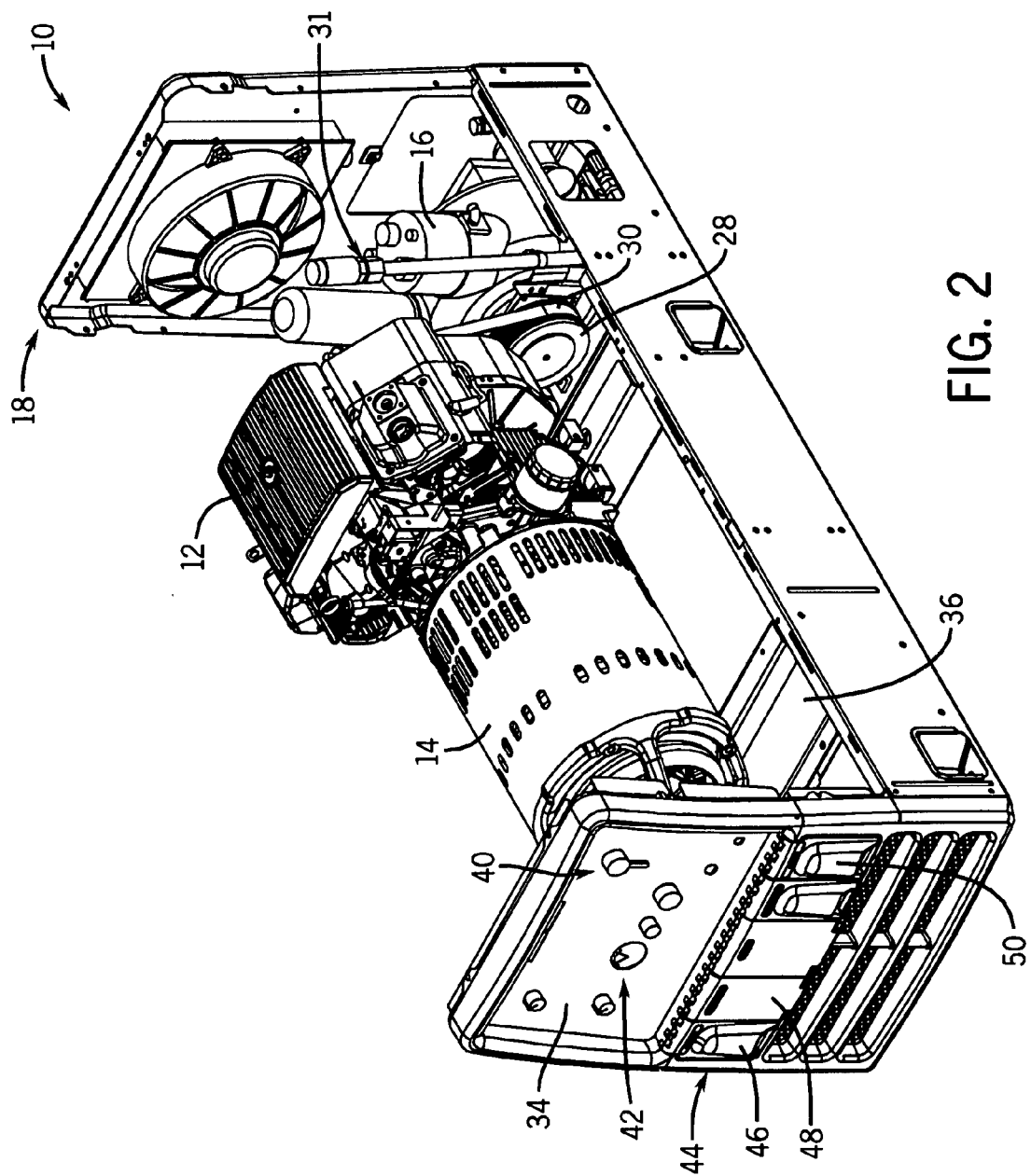
FIG. 2 is another partial perspective view of the welding generator/compressor system as illustrated in FIG. 1, wherein an entire top access panel assembly is removed to further illustrate various internal features in accordance with embodiments of the present invention.
Figure 3:
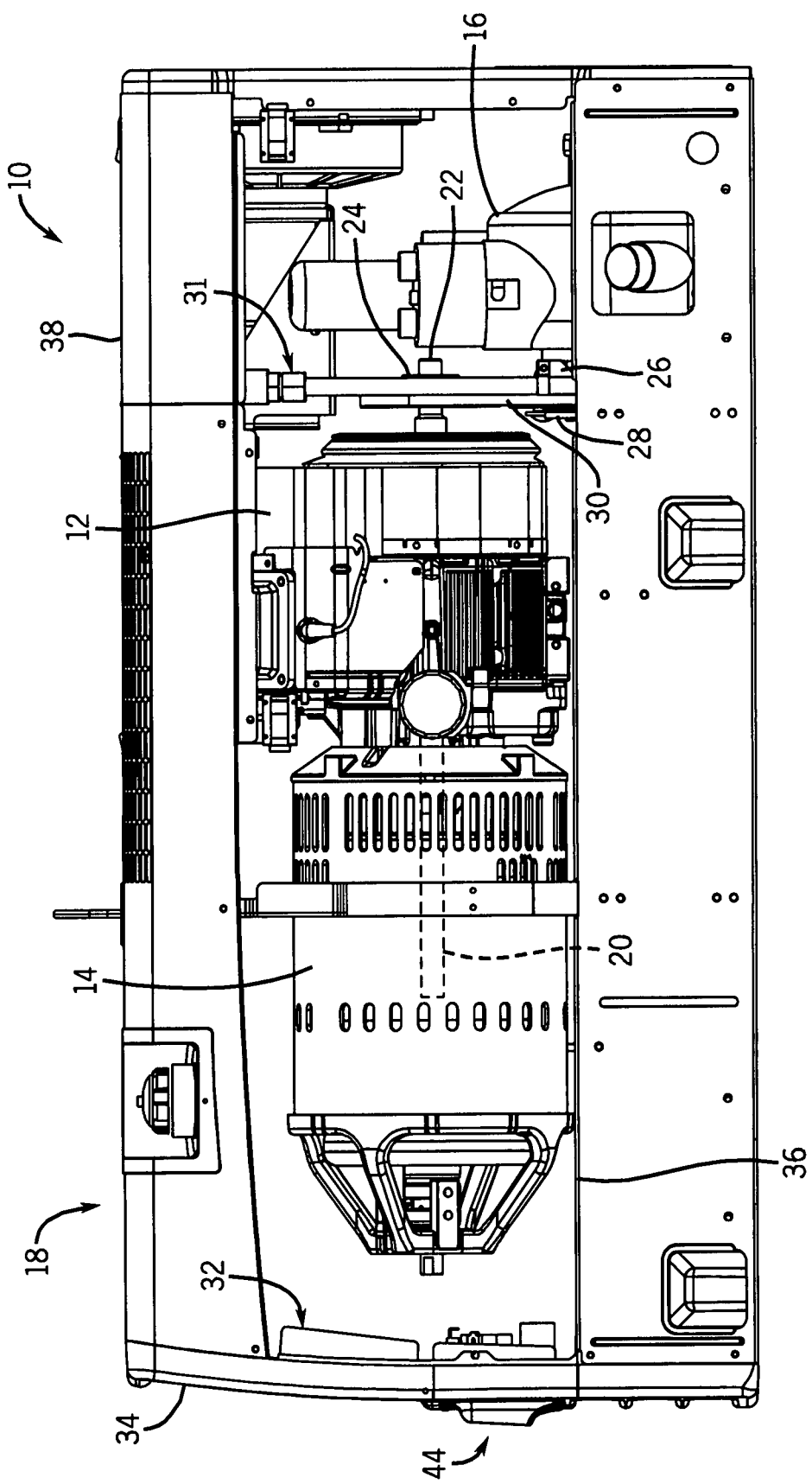
FIG. 3 is a side view of the welding generator/compressor system as illustrated in FIG. 1, wherein the two top access panels are rotated to closed positions and the side access panel is removed to further illustrate various internal features in accordance with embodiments of the present invention.

Referring now to the drawings, FIGS. 1-3 illustrate an intelligent engine-driven welding generator/charger/compressor system 10 having an engine 12 drivingly coupled to a welding generator 14 and an air compressor 16 in a single enclosure 18 in accordance with an exemplary embodiment of the present technique. As discussed in detail below, the single enclosure 18 includes multiple functionalities all in one portable system to improve productivity and reduce space consumption. Specifically, the system 10 is configured to output compressed air and electrical power for a variety of applications, including welding, cutting, battery charging, jump starting, air-powered tools, and so forth. Moreover, the system 10 includes intelligence (e.g., logic in software and/or hardware) to adjust the outputs based on various feedback of the system 10 and the external device receiving the electrical power and/or compressed air from the system 10. For example, the system 10 does not blindly provide an output power for welding and/or charging, but rather the system 10 analyzes various parameters, executes various logic, and intakes sensed feedback to make an intelligent decision regarding the output. As discussed in detail below, the system 10 includes a power supply with either shared or separate outputs for welding and charging. The charging outputs may also be used to jump start an engine driven device, such as an automobile. Further, the power supply includes control circuitry that provides a welding output and a charging output based on the selected configuration. For example, a user can select the voltage of the battery or device to be charged, or jump started, and the power supply 12 automatically adjusts the charging output accordingly. In certain embodiments, the control circuitry of the power supply includes a microprocessor implementing a charge or jump start routine to optimize the output to the battery and to prevent damaging the battery.

FIGS. 1-3 generally illustrate features of the engine 12, the welding generator 14, and the compressor 16, while the subsequent FIGS. 4-8 illustrate details of the intelligence associated with the electrical outputs for welding, charging, jump starting, and so forth. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via a clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10.

As discussed in detail below, the system 10 also may include a battery and/or a battery charge system, which may include features to monitor conditions of the battery (e.g., internal or external to the system 10) and to adjust the characteristics of the charge (e.g., variable output level, duration, etc.). Again, the battery charge system may include a variety of logic and routines disposed in hardware (e.g., memory), such that the system can intelligently adjust the output level (e.g., voltage and current) in response to feedback from the battery receiving a charge or system receiving a jump start. For example, the system 10 may include intelligence to automatically sense feedback, make logical decisions, and adjust the output based on the battery type, condition, and so forth. Thus, the system 10 may automatically adjust the voltage and current levels depending on the voltage of the battery, the degree of charge in the battery, problems with battery, the temperature of the battery, etc. In some embodiments, the system 10 may sense whether the cables are connected to a welding gun or a battery, and automatically adjust the output accordingly.

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof, to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16

As described below, the power from the engine 12 operates both the generator 14 and the air compressor 16 via a first shaft 20 (e.g., drive shaft or rotating drive shaft) and a second shaft 22 (e.g., stub shaft or drive shaft), respectively. In some embodiments, these shafts 20 and 22 may be independent from one another, while in other embodiments shafts 20 and 22 may be part of a single shaft extending through the engine 12. As illustrated, the first and second shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second shaft 22 couples indirectly to the compressor 16. However, either arrangement can be used for the connection between the engine 12 and the generator 14 and/or the compressor 16.

For example, as will be discussed in greater detail below, the engine 12 is coupled to the compressor 16 via a belt and pulley system including the second shaft 22, a pulley 24 coupled to the second shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the second shaft 22 to transmit rotation and torque via the pulleys 24 and 28 and drive belt 30 to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

The engine 12 includes a power source configured to provide power to the generator 14 and the air compressor 16. In an embodiment, the engine 12 may include a combustion engine powered by gas or diesel, LP fuel, natural gas, or other fuel and driving one or more shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine. For example, a 64 Hp engine may weigh approximately 400 lbs., whereas a similar 24 Hp engine may weigh approximately 100 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to an electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the first shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics (e.g., welding, plasma cutting, battery charging, jump starting, etc.). For example, the generator 14 may include a first section configured to drive a welding current to a welder and a second section configured to drive a current for other AC outputs (e.g., battery charging, jump starting, etc.). As suggested above, multiple generators 14 may be connected to the first shaft 20 or second shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, spray guns, saws, nail guns, screw drivers, drills, lifts, and chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 12. For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code stored on the memory and configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), the process of charging a battery, the process of jump starting a device or vehicle having a battery, and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery. Finally, the control circuitry 32 may monitor the outputs, loads, and various feedback to automatically adjust the output voltage and current levels for a particular welding gun, battery being charged, or device being jump started by the system 10.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a dial rotatable to select a mode of operation, such as a DC weld mode, an AC weld mode, a battery charge mode, a battery test mode, a battery recondition or desulfate mode, a jump start mode, an alternator test mode, a tool operation mode, or another suitable mode, or a combination thereof. The control panel 34 may also include various indicators 42 to provide feedback to the user. For example, the indicator 42 may include an LCD to display voltage, amperage, air pressure, state of battery charge, problems with battery or charge process, time remaining for battery charge, type of battery (e.g., gel cell, nickel metal hydride, lithium ion, nickel cadmium, etc.), temperature of battery, and the like. Embodiments of the control panel 34 include any number inputs and outputs, such as welding controls, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. The same outputs or different outputs may be used for battery charging, jump starting, or other applications. In an embodiment these outputs 46, 48 and 50 are coupled to various devices, tools, or batteries. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. The air hose 66 may exit the system 10 at various other locations; including the back of the system 10 proximate to the air compressor 16. For example an air tool 64 may be coupled to the compressed air output 50 via an air hose 66. The air tool 64 may include various pneumatic tools and the like. In another embodiment, a plasma cutting torch 54 may receive power from an external unit (e.g., wall outlet AC power) while receiving compressed air from the air compressor 16 of the system 10. As will be discussed further below, the external connections 44 may also include a battery connection, such as alligator clips for connection to the positive and negative terminals of a battery.

As discussed previously, the system 10 may include multiple components working in cooperation to generate power, compressed air, and other outputs. For example, in the illustrated embodiment, a single engine 12 is coupled to the generator 14 and the air compressor 16. As will be appreciated, mechanical design of such a system 10 may entail various arrangements of components to provide an efficient and reliable system 10. As discussed in detail below, the system 10 includes a variety of hardware and software (e.g., computer code stored in memory) configured to intelligently monitor a charging and/or jump starting process, analyze feedback associated with the process, and automatically control the process based on such analysis. The feedback may include battery parameters, such as temperature, current, and voltage. The system 10 also may intelligently and automatically analyze the battery to determine a battery voltage rating (e.g., 6V, 12V, 24V, 36V, 48V), a battery type (e.g., gel cell, nickel cadmium, nickel metal hydride, lithium ion, etc.), a battery performance condition (e.g., poor, fair, average, good, or excellent), a battery charge state (e.g., 10%, 20%, 30%, . . . 90%, 100%), and so forth. Some of the foregoing may be based on tests performed by the system 10. For example, the system 10 may intelligently perform various load tests on the battery to evaluate performance. The system 10 also may intelligently recondition or delsulphate the battery if problems are identified during testing. The system 10 also may include an alternator voltage check, reverse polarity protection, short circuit protection, and other control logic. For example, the system 10 may include logic to automatically vary the charge output (e.g., current) in discrete steps or continuously in response to feedback, thereby maximizing the speed and effectiveness of the charge while also minimizing any potential damage to the battery.

Figure 4:
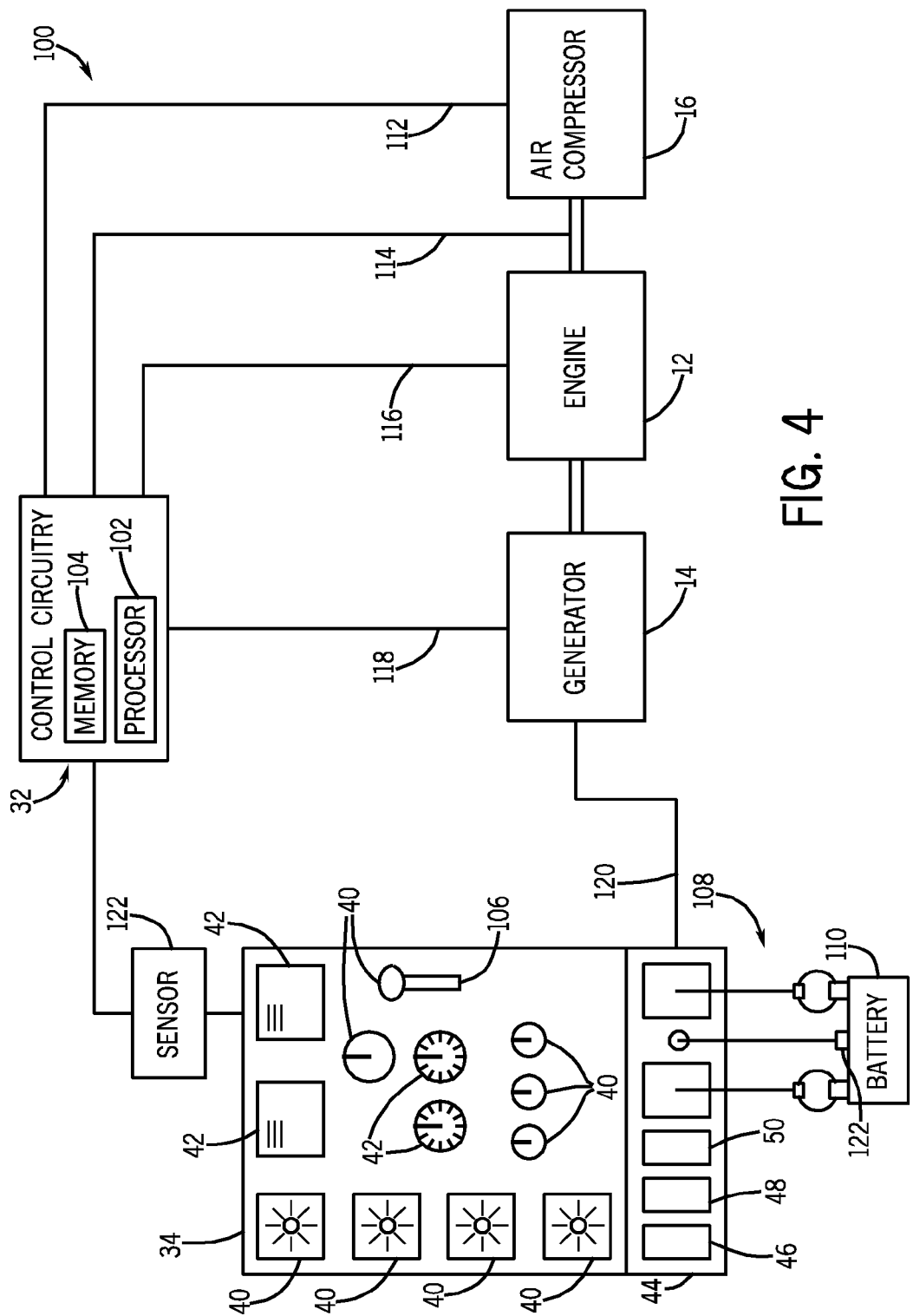
FIG. 4 is a block diagram of an exemplary embodiment of a control system of the welding system and control panel as illustrated in FIGS. 1-3.

FIG. 4 is a block diagram illustrating an embodiment of a control system 100 of the welding system 10 and the included battery charger system. Again, the illustrated system 10 includes the air compressor 16 drivingly coupled to the engine 12 (via the second shaft 22, the pulley 24, the drive belt 30, the compressor pulley 28, and the compressor drive shaft 26 discussed above). The illustrated system 100 also includes the generator 14 coupled to the engine 12, as well as the control panel 34 and the various connections to each component as described further below.

The illustrated system 100 of FIG. 4 includes the control circuitry 32 having a processor 102 and memory 104, wherein the system 100 may be controlled or monitored by an operator through the control panel 34. The control panel 34 includes one or more user inputs 40 which may include a battery/weld switch 106, and the indicator 42, all of which may be used to monitor, regulate, or generally control the battery charger system as discussed in further detail below. For example, the battery/weld switch 106 enables an operator to switch the output of the generator between a battery jump/charge option and DC or AC welding. The user inputs 40 may enable an operator to switch between a battery charge function or a battery jump function, select the voltage of the battery (6V, 12V, 24V, 36V, 48V), select the type of the battery (e.g., gel cell, nickel metal hydride, nickel cadmium, lithium ion), select the charge mode (e.g., rapid high current charge, trickle low current charge, staged multi-current charge, smart charge, etc.), and/or select any other battery parameters. For example, the smart charge may be described as an intelligent continuously variable current charge based on feedback associated with the charging process.

As discussed above, at the base of the control panel 34 the system 100 may include one or more external connectors 44, which may include external battery connectors 108 (e.g., a pair of cable connectors) to positive and negative terminals on a battery 110. For example, an operator may set the battery 110 in a location near the front of the welding system 10 and control panel 34, and connect the battery using the external battery connectors 108. The external battery connectors 108 may include a pair of cables of a suitable length to provide sufficient distance between the welding system 10 and the battery 110. In some embodiments, the cables may be wound on one or two reels within the system 10, such that the user can draw the cables from system 10 when desired and then allow the reel(s) to pull the cables back inside the system 10 when not in use. The system 10 also may include a battery tray to support the battery 110 during a charging process.

The control circuitry 32 may include one or more connections to the various components of the control system 100. For example, the control circuitry may include a connection 112 to the compressor 16, a connection 114 to the clutch-pulley system between the engine 12 and the compressor 16, a connection 116 to the engine 12, and a connection 118 to the generator 14. As discussed above, these connections may facilitate intelligent operation and control of the compressor 16, engine 12, generator 14, and battery charging/jump starting functionality of the system 10. For example, connection 112 may enable control (e.g., on, off, regulator adjustment, etc.) of the compressor 16, connection 116 may enable control (e.g., on, off, speed adjustment, etc.) of the engine 12, and so forth.

The control circuitry 32 may also control the generator 14 through connection 118. The output of the generator 120 may be directed to the external connections 44, and may provide the power to drive the various devices connected to the external connections 44. For example, depending on the operation of the weld/battery switch 106, the generator 14 may provide AC weld, DC weld, or battery jump/charge output to the external connections 44. If the battery jump/charge output is provided to the external connections 44, then the battery connectors 108 may be used to connect with terminals of the battery 110.

To ensure correct operation of the welding system 10 and the battery jump/charge and verification system described herein, the control system 100 includes one or more sensors 122 (e.g., temperature sensors, current sensors, voltage sensors, charging sensors). For example, the one or more sensors 122 may include a current sensor, a voltage sensor, or a combination thereof. The one or more sensors 122 may be disposed within the enclosure 18, coupled to the external connections 44, coupled to battery 110, or at any other suitable location. In some embodiments, as discussed further below, the one or more sensors 122 include the sensor 122 (e.g., temperature sensory for monitoring temperature of the battery 110 or ambient temperature. During operation of the battery jump/charge system of the welding system 10, or during operation of a welding torch connected to the welding system 10, the sensor 122 (e.g., current sensory is used to measure the current of the external device connected to the welding system 10 by the external connections 44. For example, if a welder is connected to the system 10, the sensor 122 (e.g., current sensory may be used to monitor the current of the welder. If the battery 110 is connected to the system 10, the sensor (e.g., current sensory acts as a charging sensor, and measures the current of the battery 110 during the charging process. Thus, in some embodiments, it may be advantageous to have two current sensors, with one current sensor dedicated to monitoring weld output and the other current sensor as a dedicated charging sensor.

During operation of the control system 100, the control circuitry 32 may be responsible for monitoring the battery 110 and intelligently controlling the charging of the battery 110. The memory 104 may store one or more charging algorithms for various batteries that may be connected to the welding system 10. For example, in one embodiment, if both 12 V and 24 V batteries may be connected to the welding system 10, charging algorithms for each battery type may be stored in the memory 104. Similarly, if the algorithms are dependent on various battery parameters, as discussed further below, appropriate algorithms may be stored in the memory 104. The microprocessor 102 may process the information received from the one or more sensors 122 and the user inputs 40. Using the battery parameters received from the one or more sensors 122 and the user inputs 40, the processor 102 may perform a battery verification process, select and execute an appropriate charging algorithm, and/or continue or discontinue the charging cycle.

Figure 5:
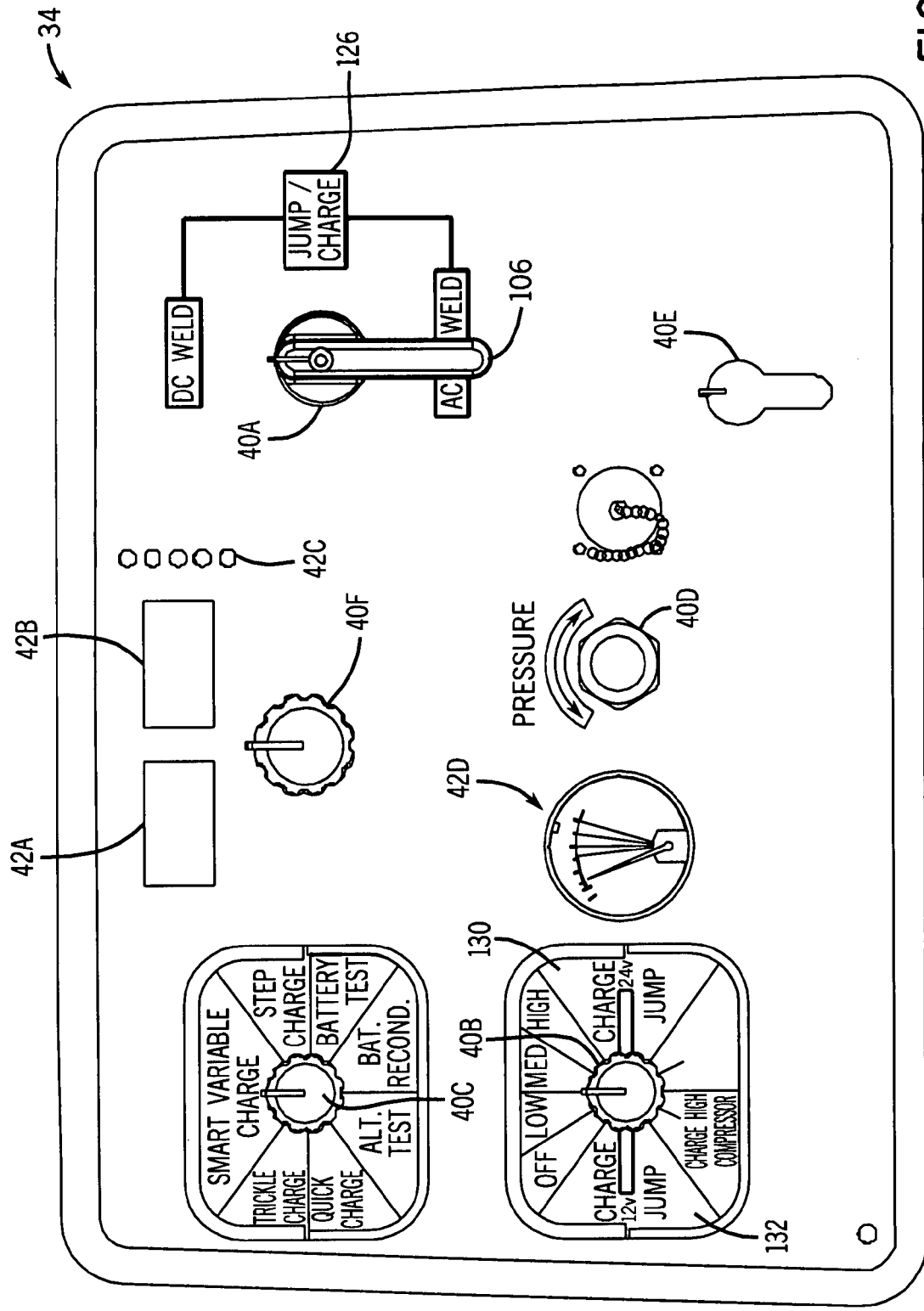
FIG. 5 is a front view of an embodiment of a control panel of a welding system with a battery jump/charge option.

FIG. 5 illustrates a front view of an embodiment of the control panel 34 having various inputs 40 and indicators 42. The inputs 40 may include one or more knobs, buttons, switches, keypads, or other devices configured to select an input or display function. The knobs and switches may control operation of the engine 12, the generator 14, and the compressor 16. The indicators 42 may be various gauges, meters, or audio or visual displays.

In the illustrated embodiment, the control panel 34 includes user inputs/controls 40A, 40B, 40C, 40D, and 40E, and indicators/displays 42A, 42B, 42C, and 42D. Specifically, the input 40A includes the weld/battery switch 106, which can be rotated to select a DC weld mode, a jump/charge mode, or an AC weld mode. The input 40B can be rotated to select an off position, a low output mode, a medium output mode, or a high output mode for welding/cutting. The input 40B also can be rotated to select a battery voltage, and a charge mode or a jump start mode. For example, in the embodiment shown in FIG. 5 the input 40B allows selection between a 12 V or 24 V battery. However, additional user inputs or user input 40B may allow selection of other voltages (6V, 12V, 24V, 36V, 48V, etc.). If the charge mode is selected with input 40B, then the input 40C may be rotated to select a smart variable charge mode, a trickle charge mode, a quick charge mode, a step charge mode, a battery test mode, a battery recondition/delsulphate mode, or an alternator test mode. Furthermore, the input 40D may be rotated to increase or decrease the pressure of the compressor 16. The inputs 40E and 40F also may be rotated to control various aspects of the welding process, the compressor, or the battery charging. For example, the inputs 40E and 40F may control current, voltage, or other parameters.

Regarding the various indicators/displays, the indicators 42A and 42B may be liquid crystal displays (LCDs), LEDs, plasma displays, or vacuum florescent displays, or any combination thereof, configured to display various conditions of the welding process, the battery charging process, the jump starting process, the air compressor, or a combination thereof. For example, the indicators 42A and 42B may display current, voltage, temperature, mode of operation, percent of charge complete or remaining, battery test results, and so forth. The other indicators 42C and 42D also may display a variety of information. For example, the indicator 42D may be a pressure gauge configured to indicate the pressure of the compressor 14. As will be appreciated, the control panel 34 is not limited to the components described herein, and may include any number of components as desired or required for monitor or control of the welding system 10 and control system 100, such as multiple user inputs, display devices, gauges, etc.

As discussed above, the weld/battery switch 106 enables an operator to switch the generator 14 between a welding output and a charging output. Thus, if the user desires to charge a battery 110, the operator may first switch the weld/battery switch 106 to a battery jump/charge option 126. Once the switch is turned to the weld/battery option 126, weld output is turned off, and the battery charge output is turned on. In addition, user inputs 40 may allow selection of other battery or charging parameters. For example, region 130 of the input 40B may correspond to a jump start mode, while region 132 may correspond to battery charge mode. In some embodiments, the input 40B may include a plurality of different battery charge/jump modes corresponding to different battery voltage ratings and/or types. Alternatively, the control panel 34 may include another input having selections for voltage ratings, such as 6V, 12V, 24V, 36V, 48V, and so forth. In addition, the control panel 34 may include a supplemental input having selections for battery types, such as gel cell, nickel metal hydride, nickel cadmium, lithium ion, and so forth.

Figure 6:
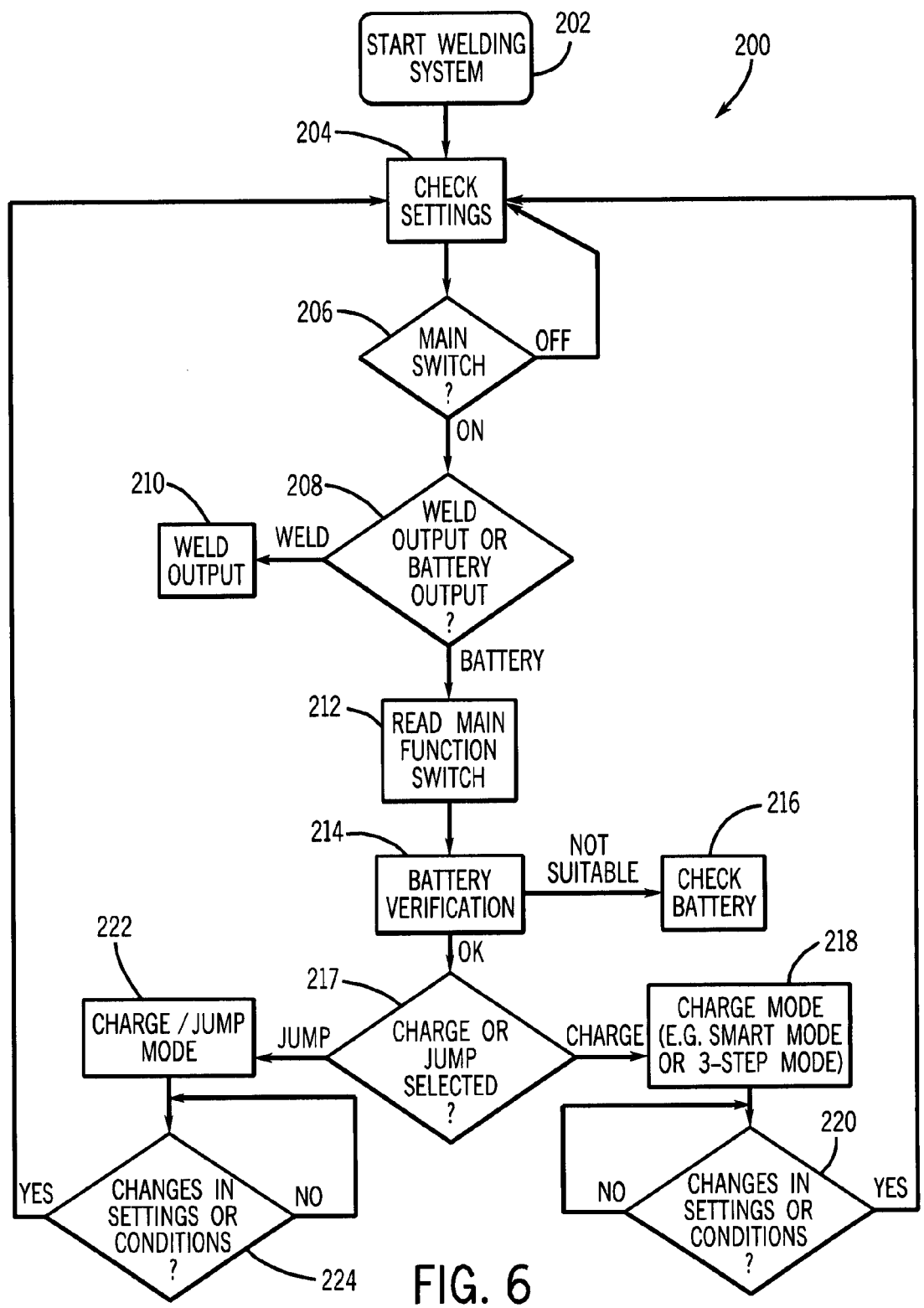
FIG. 6 is a flowchart illustrating the operation of an embodiment of a battery charger system of an exemplary welding system.

Turning now to FIG. 6, a flowchart of the process 200 of the battery jump/charge system, which may be implemented in the control circuitry 32, is shown in accordance with an embodiment of the present invention. An operator may first start the welding system (block 202) by turning a key or activating one or more of the user inputs 40 on the control panel 34. The control circuitry 32 may then check the settings (block 204) selected by the user inputs 40. The main switch is checked to determine if the engine and/or welding generator are started (block 206). If the main switch is turned off, then the system returns to checking the settings (block 202).

If the main switch is turned on, the weld/battery switch 106 is checked to determine if the output of the generator is directed to a welder or a battery charger (block 208). If the switch 106 indicates that the weld output is selected, then the output of the generator 14 is directed to the welding gun (block 210). If the switch 106 indicates that the battery jump/charge option is selected, then the battery jump/charge process 200 proceeds. In the illustrated embodiment, the process 200 may obtain an indication of a selected mode (e.g., voltage level, charge, jump, compressor, etc.) from a main function switch that may be one of the user inputs 40 (block 212). For example, the main function switch may enable selection of a 12V or 24V charge and/or jump start output. Alternatively, the process 200 may intelligently and automatically test or survey the battery to identify its characteristics, such as voltage rating (e.g., 6V, 12V, 24V, 36V, 48V, etc.), type (e.g., gel cell, nickel metal hydride, nickel cadmium, lithium ion, etc.), and so forth.

The battery verification, which is explained further below in FIG. 7, then begins to determine if the battery is suitable for charging (block 214). For example, the battery verification 214 may include various performance or functionality tests, which may provide an indication of the grade of the battery (e.g., on a scale from 1 to 10), problems with the battery (e.g., error codes indicating problems with a cell, short circuit, etc.), or general ability of the battery to be charged by the process 200 (e.g., chargeability on a scale from 1 to 10). If the battery is not suitable for charging, then a check battery indication (or other relevant information) may be signaled to an operator (block 216). Such an indication may be conveyed to the operator by an indicator 42 on the control panel 34.

If the battery verification 214 indicates that the battery is suitable for charging, then the battery will be jumped or charged depending on the user input selected (block 217). For example, a jump or charging function may be indicated through the user inputs 40 on the control panel 34. If the charge function is selected, then the battery jump/charge system may execute a charging mode, e.g., a three-step charging mode or a smart mode (block 218). For example, the smart mode may include closed-loop control using feedback to intelligently output a charging current and voltage to the battery, such that the current and/or voltage may continuously change over the course of a charging process. The feedback may include battery parameters, such as temperature, voltage, current, and so forth. For example, as the battery approaches a full charge, the smart mode may gradually decrease the current to the battery. By further example, the three-step charging mode may include: 1) a constant current step; 2) a constant voltage step; and 3) a floating current and voltage step. In addition, any battery specific three-step charging algorithms may be selected from the memory 104 and executed by the processor 102. Alternatively, as discussed above with reference to FIG. 5, the selected mode may include a trickle charge (e.g., low current), a quick charge (e.g., high current), a battery test, a battery recondition/delsulphate, an alternator test, or another functional mode relating to the battery.

During the charging process, the system checks for any change in settings or conditions of the battery (block 220). If the system does not identify any changes, then the charging process continues with the selected charging mode. If the system does identify one or more changes, then the process may automatically analyze the settings and take corrective actions and/or return to the check settings mode (block 204). For example, the changes may include a disconnection of the battery, an increase in temperature of the battery, a problem with charging the battery, a change in the inputs 40 on the control panel 34, or another change in the condition of the battery. By further example, the system may monitor the charge level and, upon reaching a predefined charge level of the battery (e.g., 10, 20, 30, 40, 50, 60, 70, 80, 90, or 100 percent charge), initiate a change in the output voltage, output current, or charge mode.

Alternatively, if the battery jump mode is selected (block 217), then the process 200 may execute a user selected, default, or intelligently computer selected jump mode to provide a jump output to the battery 110 (block 222). For example, the jump mode may include a constant voltage jump mode, wherein a constant voltage is applied to the battery 110. Again, similar to block 220, the process 200 checks for any changes to the settings or conditions of the battery (block 224). If the system does not identify any changes, then the charging process continues with the selected charging mode. If the system does identify one or more changes, then the process may automatically analyze the settings and take corrective actions and/or return to the check settings mode (block 204).

Figure 7:
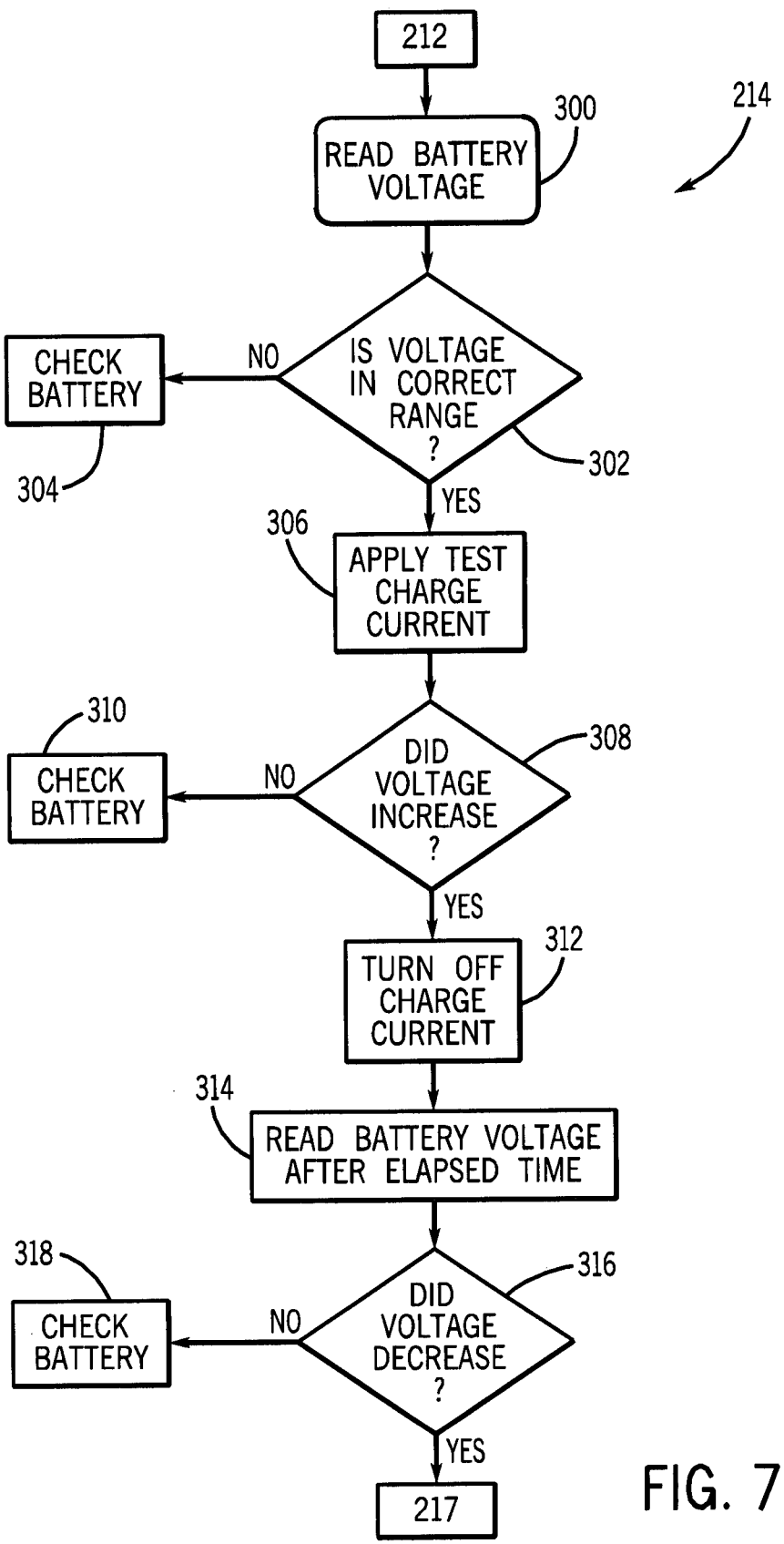
FIG. 7 is a flowchart illustrating the operation of an embodiment of a battery verification system of the battery charger system of FIG. 6.

FIG. 7 is a flowchart illustrating an embodiment of the battery verification process 214 of the battery jump/charge process 200. The battery verification process 214 may include logic to prevent undesirable charging of an undersized (too few cells) battery or an oversized (too many cells) battery. The battery verification process 214 also may include logic to prevent undesirable charging of a battery that is unable to receive a charge. Advantageously, the battery verification process 214 may prevent damage to a battery or minimize risks involved with charging already damaged batteries. Further, the battery verification process 214 may prevent damage to the charger and improve user safety. As described in detail in FIG. 7, the battery verification process 214 checks whether the voltage of the battery is in the acceptable range for the battery charger, and then checks whether the voltage of the battery increases after a current is applied. If the voltage increases, the battery verification process 214 checks the battery after an elapsed duration of time to determine if the battery is able to hold a charge. If the battery verification process 214 determines that the battery is acceptable for charging, the jump or charge process continues as indicated in FIG. 6.

The illustrated battery verification process 214 begins by obtaining feedback to indicate the voltage from the battery (block 300) connected to the external connections 44 of the welding system 10. The voltage is checked to determine if the voltage of the battery is in the correct range for the battery jump/charge system (block 302), for example, as selected via one of the user inputs 40, automatic/intelligent detection, or a combination thereof. For example, the process 214 may read battery information from a radio frequency identification tag (RFID) tag disposed on the battery or other feedback from the battery. By further example, if one of the user inputs 40 indicates that the battery is a 24 V battery, then the voltage of the battery will be checked for compliance with that selection. Although a discrete battery voltage, such as 12 V or 24 V may be selected, for each discrete selection the battery verification process 214 may accept a range of voltages around the selected voltage. If the voltage of the battery is not in the correct range, then a check battery indication may be signaled to an operator (block 304). Again, such an indication may be provided to the operator by one of the indicators 42 on control panel 34. If the voltage of the battery is in the correct range, then a test charge current is applied to the battery (block 306).

After the test charge current is applied, the voltage of the battery is checked to determine if the voltage of the battery has increased (block 308). If the voltage of the battery did not increase, e.g., indicating that the battery may be unable to be charged, then a check battery indication may be signaled to the operator (block 310) through the indicator 42 on control panel 34. If the battery voltage increased after the test charge current was applied, then the test charge current may be turned off (block 312), and the battery voltage may be read after a duration of time has elapsed (block 314). By waiting for a user-selected or default time, the battery verification process 214 can further determine if the battery may be capable to hold a charge. The voltage may be read to determine if the voltage did not decrease after the duration of time elapsed (block 316). If the voltage of the battery decreased, e.g., indicating that the battery may be unable to hold a charge, a check battery indication is signaled to an operator (block 318). If the voltage of the battery did not decrease after the duration of time has elapsed, then the battery verification process 212 is complete and the battery jump/charge process may continue, for example, as shown in block 217 of FIG. 6.

Figure 8:
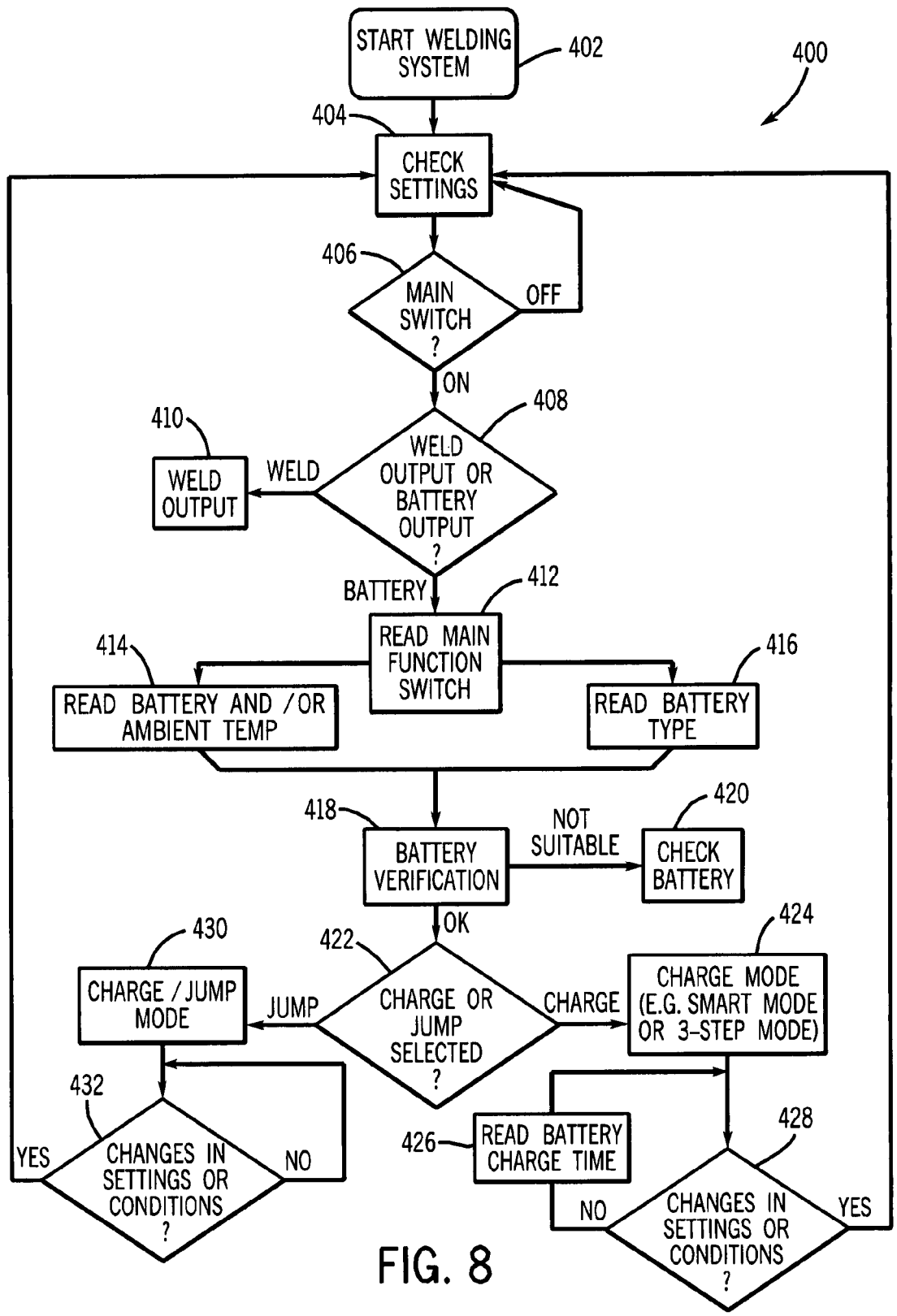
FIG. 8 is a flowchart illustrating the operation of another embodiment of a battery charger system of an exemplary welding system.

FIG. 8 depicts a flowchart of an alternate embodiment of a battery jump/charge process 400. The embodiment of the battery jump/charge process 400 depicted in FIG. 8 is similar to the battery/jump charge process 200 depicted in FIG. 6. For sake of brevity, blocks 402 through 412 are substantially the same as blocks 202 through 212 shown and described with reference to FIG. 6. However the process 400 depicted in FIG. 8 includes additional battery or charging parameters that may be incorporated into jump/charge process 400.

At block 414, the battery jump/charge process 400 may include reading the battery temperature or ambient temperature. For example, as indicated above, the weld system 10 and control system 100 may include a temperature sensor that may read the temperature of the battery or the ambient temperature. Such information may be used during the jump-starting process or in selection of a specific charging algorithm. For example, some battery types may be more difficult to jump start if the ambient temperature is relatively low, e.g., in some colder climates. Thus, a higher constant voltage may be used to jump start a battery under those conditions. Similarly, a charging algorithm for a colder climate may alter the current or voltage applied during the charging process.

Additionally, the type of the battery being charged or jumped may be read from the user inputs 40 or automatic detection (block 416). For example, different battery types may be charged by the battery jump/charge process 400. Such battery types may include a nickel cadmium battery, a lithium-ion battery, nickel metal hydride battery, or any other battery type. The battery type selection may then be used during the jump-starting or the charging stages of the process 400. For example, different charging algorithms may be selected according to the battery type, as well as the battery voltage and/or temperature parameters. Either battery and/or ambient temperature (block 414) and battery type (block 416) may be used in the battery jump/charge process 400, or both battery parameters may be used.

The battery jump/charge process 400 also includes a battery verification process (block 418), which is substantially the same as the battery verification process 214 depicted in FIG. 7. If the battery verification process 418 indicates that the battery is not suitable for charging, then a check battery indication may be provided to an operator (block 420). If the battery verification process 418 indicates that the battery is suitable for charging, then the selection of a jump function or charge function is read from the user inputs 40 or automatic selection based on feedback (block 422).

If the charge function is selected, the battery is charged using the a smart charge mode, a three-step charging mode, or another suitable mode as discussed above (block 424). Additionally, in some embodiments, another battery parameter such as the battery charge time (block 426) may be monitored during the charge cycle. The battery charge time may be compared to a stored value, such as a normative value for the battery type and stored in the memory 104, and the comparison may be used to estimate the charge state of the battery. The charge process continues until changes in the settings and/or conditions are detected at block 428. If no changes are detected at block 428, then the process continues. If changes are detected at block 428, then the process 400 may return to check settings (block 404). If the charge/jump mode is selected at block 422, then the process 400 may provide a desired jump start output (block 430). For example, the charge/jump mode 430 may provide a constant voltage to the battery as discussed above. The charge/jump mode 430 continues until the process 400 detects changes in the settings and/or conditions at block 432. If no changes are detected at block 432, then the process continues. If changes are detected at block 432, then the process 400 may return to check settings (block 404).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a portable welding unit, comprising:
an engine;
a generator coupled to the engine;
a compressor mechanically and drivingly coupled to the engine;
a smart battery charger coupled to the generator, wherein the smart battery charger is configured to automatically adjust an output of the smart battery charger in response to a temperature feedback indicative of an ambient temperature, wherein the smart battery charger is configured to measure a voltage of a battery after a duration of time has elapsed without a current applied to the battery; and
a control panel comprising a switch, wherein the switch provides for selection among an AC welding output, a DC welding output, or a battery charger output from the portable welding unit.

2. The system of claim 1, wherein the smart battery charger comprises a plurality of charging modes that are executable based on user input, automatic closed loop control, or a combination thereof.

3. The system of claim 1, wherein the smart battery charger comprises a plurality of user inputs including a battery type selector, a battery voltage selector, a battery function selector, or a combination thereof.

4. The system of claim 1, wherein the smart battery charger is configured to monitor battery temperature, battery voltage, battery current, the ambient temperature, or a combination thereof, and the smart battery charger is configured to execute logic based on the monitored battery temperature, battery voltage, battery current, ambient temperature, or a combination thereof.

5. The system of claim 1, wherein the smart battery charger comprises battery test logic configured to test battery performance, or capability of the battery to retain a charge, or a combination thereof.

6. The system of claim 1, wherein the smart battery charger comprises battery reconditioning logic.

7. The system of claim 1, wherein the smart battery charger is configured to apply a current to the battery and to measure a voltage of the battery after the current is applied.

8. The system of claim 7, wherein the smart battery charger is configured to stop applying the current to the battery when the voltage of the battery after the duration of time is not greater than the voltage of the battery before the duration and to continue applying current to the battery when the voltage of the battery after the duration of time is greater than the voltage of the battery before the duration.

9. The system of claim 1, comprising a control panel having a welding control, a battery charging control, a jump starting control, or a combination thereof.

10. The system of claim 1, wherein the portable welding unit comprises a pair of cable connectors for connection to positive and negative terminals of the battery.

11. The system of claim 10, wherein the portable welding unit comprises one or more reels for winding the cable connectors inside the portable welding unit.

12. A system, comprising:
a portable welding unit, comprising:
an engine;
a generator coupled to the engine;
a compressor mechanically and drivingly coupled to the engine;
a smart battery charger coupled to the generator, wherein the smart battery charger comprises a battery test mode configured to test a battery prior to starting a charge mode or a jump start mode, wherein the battery test mode comprises a voltage test mode that gradually increases in voltage to determine if the battery is acceptable for charging wherein the smart battery charger is configured to automatically adjust an output of the smart battery charger in response to a temperature feedback indicative of an ambient temperature, and wherein the smart battery charger is configured to measure a voltage of the battery after a duration of time has elapsed without a current applied to the battery.

13. The system of claim 12, wherein the smart battery charger is configured to automatically adjust a charging output, a jump start output, or both, in response to the voltage test mode.

14. The system of claim 12, wherein the smart battery charger is configured to read battery information from a radio frequency identification tag (RFID) tag disposed on the battery.

15. A system, comprising:
a portable welding unit, comprising:
an engine;
a generator coupled to the engine;
a compressor mechanically and drivingly coupled to the engine;
a smart battery charger coupled to the generator, wherein the smart battery charger is configured to selectively charge a battery in a constant current mode, a constant voltage mode, and a floating current and voltage mode wherein the smart battery charger is configured to automatically adjust an output of the smart battery charger in response to a temperature feedback indicative of an ambient temperature, and wherein the smart battery charger is configured to measure a voltage of the battery after a duration of time has elapsed without a current applied to the battery.

16. The system of claim 1, wherein the smart battery charger is configured to monitor the ambient temperature.

17. The system of claim 1, wherein the smart battery charger is configured to monitor a battery temperature as an indicator of the ambient temperature.

18. The system of claim 1, wherein the smart battery charger is configured to select a charging algorithm at least partially based on the temperature feedback indicative of the ambient temperature.

19. The system of claim 1, wherein the smart battery charger comprises a battery test mode configured to test the battery prior to starting a charge mode or a jump start mode.

20. The system of claim 12, wherein the smart battery charger is configured to monitor the ambient temperature.

21. The system of claim 12, wherein the smart battery charger is configured to monitor a battery temperature as an indicator of the ambient temperature.

22. The system of claim 12, wherein the smart battery charger is configured to select a charging algorithm at least partially based on the temperature feedback indicative of the ambient temperature.

23. The system of claim 15, wherein the smart battery charger is configured to monitor the ambient temperature, a battery temperature as an indicator of the ambient temperature, or a combination thereof, wherein the smart battery charger is configured to select a charging algorithm at least partially based on the temperature feedback indicative of the ambient temperature.

24. The system of claim 15, wherein the smart battery charger comprises a battery test mode configured to test the battery prior to starting a charge mode or a jump start mode.

25. The system of claim 15, wherein the smart battery charger is configured to charge the battery in a multi-step charging mode, wherein the multi-step charging mode comprises the constant current mode, the constant voltage mode, and the floating current and voltage mode in a charging sequence.

26. A system, comprising:
a portable welding unit, comprising:
an engine;
a generator coupled to the engine;
a compressor mechanically and drivingly coupled to the engine; and
a smart battery charger coupled to the generator, wherein the smart battery charger is configured to automatically adjust an output of the smart battery charger in response to feedback from at least one sensor, the smart battery charger is configured to automatically adjust the output of the smart battery charger in response to a temperature feedback indicative of an ambient temperature, and the smart battery charger comprises a battery test mode configured to test a battery prior to starting a charge mode or a jump, and wherein the smart battery charger is configured to measure a voltage of the battery after a duration of time has elapsed without a current applied to the battery start mode.

* * * * *